(12) United States Patent
Le Bars et al.

(10) Patent No.: US 7,762,593 B2
(45) Date of Patent: Jul. 27, 2010

(54) BALL COUPLER

(75) Inventors: Nicolas Le Bars, Saint-Malo (FR); Jean-François Vallet, Janze (FR)

(73) Assignee: Legris SA, Rennes (FR)

( * ) Notice: Subject to any disclaimer, the term of this patent is extended or adjusted under 35 U.S.C. 154(b) by 15 days.

(21) Appl. No.: 12/174,274

(22) Filed: Jul. 16, 2008

(65) Prior Publication Data

US 2009/0021007 A1   Jan. 22, 2009

(30) Foreign Application Priority Data

Jul. 18, 2007   (FR) .................................. 07 05178

(51) Int. Cl.
    *F16L 37/18* (2006.01)
(52) U.S. Cl. ...................... 285/316; 285/277
(58) Field of Classification Search ................. 285/315, 285/316, 314, 277, 276
    See application file for complete search history.

(56) References Cited

U.S. PATENT DOCUMENTS

| 2,006,833 | A | * | 7/1935 | Jensen | 285/277 |
| 2,470,256 | A | * | 5/1949 | McIlroy | 285/277 |
| 3,083,042 | A | * | 3/1963 | Collar | 285/93 |
| 6,129,334 | A | * | 10/2000 | Kuwabara | 251/149.6 |
| 6,511,100 | B1 | * | 1/2003 | Le Clinche | 285/316 |
| 6,568,717 | B1 | * | 5/2003 | Le Clinche | 285/315 |
| 6,581,907 | B1 | * | 6/2003 | Kuwabara et al. | 251/149.6 |
| 6,908,118 | B2 | * | 6/2005 | Fumioka | 285/277 |
| 7,007,983 | B2 | * | 3/2006 | Arosio | 285/316 |
| 7,213,845 | B2 | * | 5/2007 | Sato et al. | 285/86 |
| 7,452,006 | B2 | * | 11/2008 | Kohda | 285/316 |

FOREIGN PATENT DOCUMENTS

| DE | 100 34 337 | 1/2002 |
| FR | 2 104 213 | 4/1972 |
| FR | 2 786 848 | 6/2000 |

* cited by examiner

*Primary Examiner*—David E Bochna
(74) *Attorney, Agent, or Firm*—Muncy, Geissler, Olds & Lowe, PLLC

(57) ABSTRACT

A ball coupler having a longitudinal axis and including a male tubular endpiece; a female tubular endpiece; and a tubular sleeve extending the female endpiece and presenting slots for forming a cage for retaining balls for blocking the male endpiece in the female endpiece. A grip is coaxial about the sleeve and mounted to turn about the longitudinal axis of the coupler between at least two angular positions relative to the sleeve, the grip having a housing for each ball. A resilient return device urges the grip into its first position, including in the grip, a ring that is constrained to turn with the grip and that is movable axially relative thereto.

4 Claims, 2 Drawing Sheets

BALL COUPLER

The present invention relates to a ball coupler suitable for use, in particular in circuits for conveying fluid under pressure, in order to provide quick coupling between two circuit elements such as a hose and a member for delivering or receiving fluid, or to hoses.

More particularly, the couplings concerned are of the type described in document FR-A-2 786 848.

BACKGROUND OF THE INVENTION

Ball couplers are known that comprise a male tubular endpiece presenting an outer annular flange with a groove defined behind the flange, and a female tubular endpiece for receiving the male tubular endpiece, the endpieces being designed to be associated with respective elements of the circuit. The male endpiece is held in the female endpiece by locking means that act on balls that are received in the groove behind the annular flange. In general, the locking means comprise a ball-retaining cage mounted via one end on the female endpiece so as to extend beyond the female endpiece, and a grip mounted on the retaining cage so as to be capable of being turned between first and second positions. The grip has internal camming surfaces that are angularly offset relative to one anther and that are arranged so that when the grip is in its first position, the balls are held projecting into the inside of the retaining cage so as to retain the annular flange of the male endpiece, and when the grip is in its second position, the balls are released radially and can be taken to a retracted position, thereby releasing the flange and enabling the male endpiece to be extracted from the female endpiece.

Thus, the coupling is unlocked by causing the grip to turn relative to the sleeve. The risk of such a movement being of accidental origin is limited and this constitutes one of the main advantages of a coupler of this type, since the probability of the coupler being unlocked in untimely manner is small.

The above-mentioned document describes two main embodiments. One of them is an embodiment without a valve member for closing the duct, with the connection being undone while still connected to a source of fluid under pressure. The other includes a valve member, which thus opens when the connection is made and closes when the connection is undone. In that second embodiment, there is a variant in which disconnection takes place in two stages: a first stage during which the valve member is closed and the hose downstream from the connection (downstream relative to the source of fluid under pressure) is purged, and a second stage during which the physical separation of the connection is completed, but without there being any pressure in the connection.

In those embodiments, means are described for returning the grip into a position in which it locks the connection, i.e. a position in which the flange cannot be extracted because it is not possible for the blocking balls to be pushed back radially by the flange during such a movement. This is also the position in which the blocking means are to be found when there is no male endpiece, which position does not act in all of the embodiments described to prevent a connection being made.

The invention relates specifically to a ball coupler in any of the above-mentioned variants in which the grip-return means are improved so as to be even more robust and less expensive to fabricate for a more sophisticated coupler.

SUMMARY OF THE INVENTION

To this end, the invention provides a ball coupler having a longitudinal axis and comprising:

a male tubular endpiece;
a female tubular endpiece;
a tubular sleeve extending the female endpiece and presenting slots for forming a cage for retaining balls for blocking the male endpiece in the female endpiece; and
a grip coaxial about the sleeve and mounted to turn thereon about the longitudinal axis of the coupler between at least two angular positions relative to the sleeve, the grip possessing housing means for housing each ball, which means comprise for each ball:
  a first setback facing the corresponding slot when the grip is in a first position in order to retain the ball in question in a position for blocking the connection;
  a second setback offset angularly relative to the first setback and connected thereto so as to receive the blocking ball in a position for unblocking the connection when the grip is in a second position; and
  resilient return means for urging the grip into its first position; which return means comprise, in the grip, a ring that is constrained to turn with the grip and that is movable axially relative thereto, said ring presenting two end surfaces, one of which faces towards a shoulder of the sleeve for slidably bearing thereagainst to co-operate in reversibly transforming turning movement of the grip into axial movement of the ring relative to said grip, and the other of which forms the bearing face for a compression spring tending to urge said ring against said shoulder.

In this configuration, the coupler is more robust. The return spring is of the well-tried compression spring type, there operates solely under stress along the direction of its axis, unlike the spring described in the above-mentioned document.

In a preferred embodiment of the invention, the shoulder of the sleeve presents a projection turned towards the sloping ring, with the end surface of the ring that faces the projection constituting, for said projection, an unstable bearing surface in the form of a ramp extending between two points that are axially offset relative to each other, the point of the ramp that is furthest from the shoulder being associated with an angular abutment for the projection in such a manner as to index the position of the grip and of the sleeve in spite of the constantly present resilient return force urging the grip towards the shoulder of the sleeve. The surface of the projection that is in contact with the slope is of small area and the plastics materials used ensure that friction between the projection and the ramp is very low, thereby encouraging reversibility of the movement and thus enabling a weak spring to be used.

In preferred manner, the coupler includes, in the grip, an annular setback into which the first setbacks open out axially in such a manner as to receive the balls in an unblocking position, and a second ring mounted in the annular setback for sliding between a position in which it releases the annular setback, and a position in which it closes it, and towards which it is urged resiliently, pushing the balls into their first setback, and the compression spring is placed between said two rings.

This provides a coupler in which only one spring is used and the grip is axially decoupled from the spring so that resistance to the grip being turned is due solely to the co-operation between the sloping ring and the shoulder of the sleeve, and to the forces involved therewith, independently of any interfering friction force.

In the variant embodiment of the coupler described in document FR-A-2 786 848 that provides for disconnection to take place in two stages, with the grip being turned in one direction and then in the other, the end surface of the ring facing towards the shoulder has two ramps adjacent to each other at the point where the grip is angularly indexed relative to the sleeve. Thus, regardless of the direction in which the grip is turned manually, it returns to the angularly-indexed position on being released.

Other characteristics and advantages of the invention appear from the description given below of embodiments thereof.

BRIEF DESCRIPTION OF THE DRAWINGS

Reference is made to the accompanying drawings, in which.

DETAILED DESCRIPTION OF THE INVENTION

Figure 1:
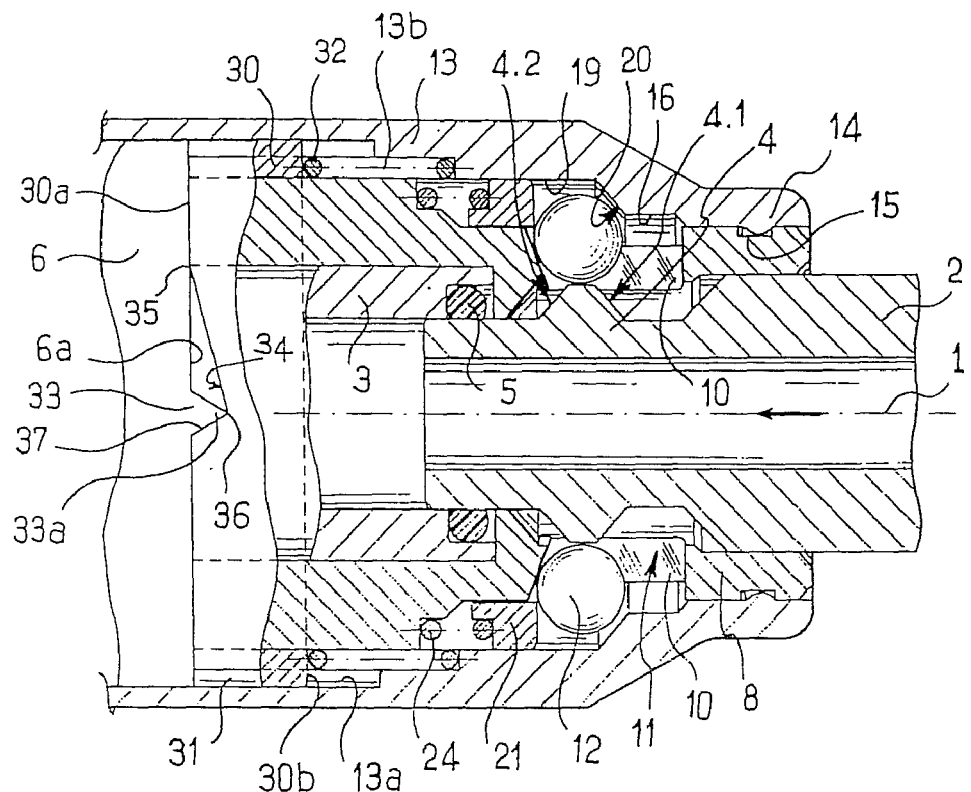
FIG. 1 is a fragmentary longitudinal section view of a coupler of the invention while it is being coupled.
Figure 2:
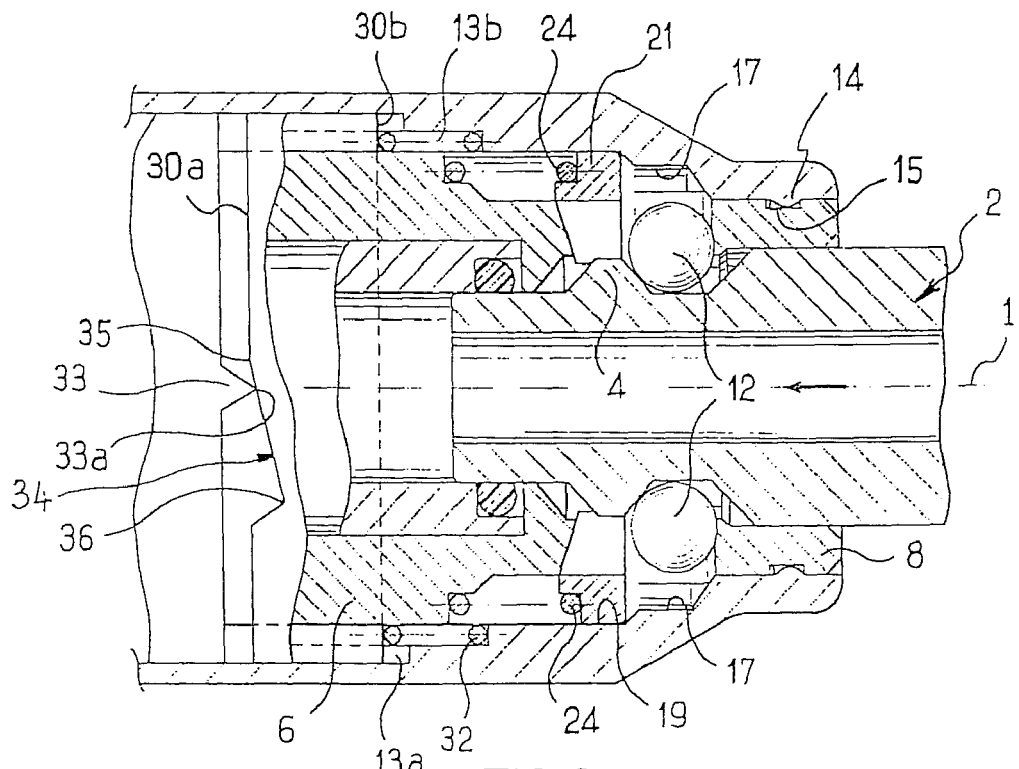
FIG. 2 is a view identical to that of FIG. 1, the coupler being in a disconnection state.

With reference to FIGS. 1 and 2, the ball coupler constituting a first embodiment of the invention about a longitudinal axis 1 comprises a male tubular endpiece given overall reference 2 and a female tubular endpiece given overall reference 3. The male tubular endpiece has an outer annular flange 4 with converging side walls 4.1 and 4.2. The male endpiece 2 is designed to be mounted on a hose and to be inserted in the female endpiece 3. The female endpiece 3 includes an O-ring 5 for sealing its coupling with the male endpiece 2. The female endpiece 3 is designed to be mounted on another hose or on a member that is to be fed with fluid under pressure.

The ball coupler also includes a sleeve given overall reference 6 mounted via one of its ends on the female endpiece 3 so as to extend coaxially thereabout. The sleeve 6 has a portion 8 of circular inside section that is larger than the section of the annular flange 4, and that extends beyond the female endpiece 3. The portion 8 of the sleeve 6 presents elongate slots 10 extending parallel to the longitudinal axis 1 at 90 degrees from one another. The slots 10 possess edges 11 that converge towards each other going towards the inside of the sleeve. Balls 12 are received in the slots 10 and are of a diameter greater than the transverse dimension of the smallest opening defined by the edges 11, such that the balls 12 cannot penetrate completely into the inside of the sleeve 6. The sleeve 6 thus forms a cage for holding the balls 12 in the coupler.

A grip 13 is mounted to pivot on the sleeve 6 via two ring portions 14 projecting towards the inside of the grip 13 so as to be received in two grooves 15 formed on the outside of the sleeve 6. The respective dimensions of the ring portions 14 and of the groove portions 15 are determined in such a manner as to enable the grip 13 to turn angularly relative to the sleeve 6 through an angle that is equal to 35 degrees, in this example. This defines first and second extreme angular positions for the grip 13 relative to the sleeve 6. Naturally, it would be possible to provide a retaining cage having some number of slots other than four for the purpose of receiving a corresponding number of balls.

The grip 13 has internal means for housing the balls 12.

These means comprise first setbacks 16, each facing a portion of a slot 10 adjacent to the portion 8 of the sleeve 6 when the grip 13 is in its first position. The first setbacks 16 are of a depth that is determined in such a manner that the balls 12 received in the first setbacks 16 define a passage of section smaller than the outside section of the annular flange 4.

Second setbacks 17, angularly offset from the first setbacks 16 through an angle equal to said 35 degrees, are provided in the grip 13 and are connected to the first setbacks 16 via sloping walls.

It will be understood that because of the angular offset that exists between each first setback 16 and each second setback 17, each second setback 17 extends in register with a slot 10 when the grip 13 is in its second position The depth of the second setback 17 is determined in such a manner that when the balls 12 are received in the second setback 17, they leave a passage of section that is not less than the section of the annular flange.

The means for housing the balls 12 also comprise a third setback 19. The third setback 19 is annular and it is offset axially relative to the first setback 16 so as to face the innermost portion of the slots 10 within the coupler, in the vicinity of the endpiece 3. The third setback 19 is connected to the first setback 16 via a conical wall 20.

The diameter of the third setback 19 is determined so that the balls received in said third setback 19 define a passage of section that is not less than the section of the annular flange 4.

A ring 21 is mounted to slide in the third setback 19. The ring 21 is mounted to slide between: a position in which it disengages the third setback 19 (FIG. 1), with the ring 21 releasing sufficient space in the third setback 19 to receive the balls 12; and a position in which it closes the third setback 19 (FIG. 2) into which the ring 21 is urged resiliently by a spring 24, i.e. towards the first setbacks, pushing the balls 12 into the first setback, the spring 24 being interposed between the sleeve 6 and the ring 21.

The operation of this coupler is described in document FR 2 786 848.

In FIGS. 1 and 2, it can be seen that a second ring 30 is housed in the grip 13 and the sleeve 6. This ring 30 is constrained to turn with the grip 13 by peripheral splines 31 that co-operate with axial grooves 13a formed in the cylindrical inside surface of the grip 13. The ring 30 can slide on the sleeve 6 and is subjected to the effect of a spring 32 that is placed around the sleeve 6, in a setback 13b formed in the grip 13 and tending to urge the ring 30 against a shoulder 6a on the sleeve 6 by bearing against one of its end faces 30a.

The shoulder 6a of this sleeve presents a projection 33 with an end 33a that bears against the other end face 30b of the ring 30. This other face 30b includes a ramp 34 between two points 35 and 36 that are axially offset relative to each other, the point 36 that is further away from the shoulder 6a being marked by the ramp 34 and an abutment face 37 against which the projection 33 can bear laterally. This point serves to index the angular position of the grip 13 relative to the sleeve 6.

In FIG. 2, the grip 13 has been turned relative to its position in FIG. 1 through an angle, e.g. of 35 degrees. The housings 17 are thus facing the balls 12 such that traction exerted on the endpiece 2 to the right of the figure leads to a disconnection, the balls possessing radial clearance space in the housings 17. When the grip is turned in this way, the ramp 34 of the ring 30 slides along the projection 33a and the spring 32 is compressed by virtue of the axial displacement of the ring 30 within the grip 13. When the operator releases the grip 13, given that the position shown is unstable, the projection 33 responds to the thrust from the spring 32 by sliding over the ramp and causing the ring 30 and thus the grip 13 to turn so as to go back to the endpiece-blocking position (if the endpiece is present), i.e. the position in which the setbacks 16 face the slots 10 and the projection 33 is in abutment against the surface 37.

Figure 3:
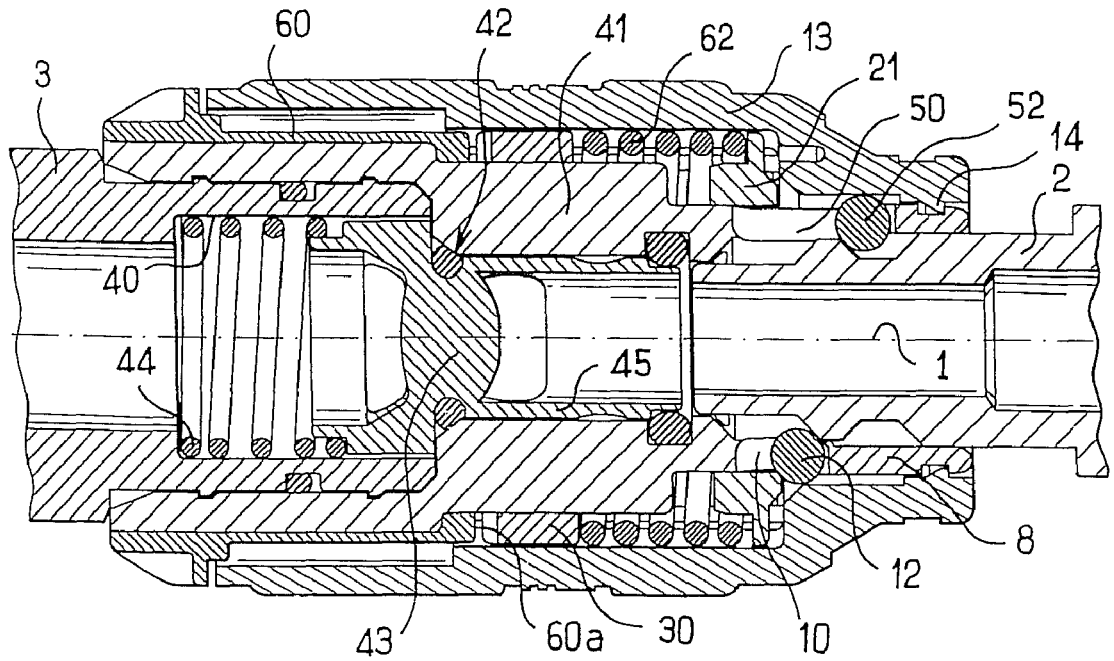
FIG. 3 shows a second embodiment of the coupler of the invention in a similar section view.

FIG. 3 shows some of the same elements as described above, and they are given the same references.

As above, the ball coupling in this embodiment has a longitudinal axis 1 and comprises a male tubular endpiece 2 and a female tubular endpiece 3. The male tubular endpiece has an outer annular flange 4. The female endpiece 3 is shaped in this embodiment to define a setback 40 within a tubular end member 41 having a seat 42 for a valve member 43 mounted to slide in the chamber 40 between a position in which the female endpiece is closed with the valve member 43 urged resiliently by a spring 44 against the seat 42, and an open position in which the valve member 43 is spaced apart from the seat 42 and defines an annular flow orifice. The valve member has a tubular perforated tail 45 extending through the seat 42 from the side of the valve member that is opposite from its resilient return spring 44.

As in the first embodiment, the ball coupler has a sleeve, constituted by the tubular end member 41 that is fitted on the female element 3 of the coupler and that carries the seat 42. As before, a portion 8 of the sleeve 41 presents elongate slots 10 receiving balls 12. The slots 10 are three in number in this embodiment and they are at 120 degree intervals from one another.

The portion 8 of the sleeve 41 likewise presents elongate slots 50 extending parallel to the longitudinal axis 1 and at 120 degrees from one another in alternation relative to the slots 10. The slots 50 are longer than the slots 10 so as to extend beyond them towards the inlet end of the endpiece and they are of the same section as the slots 10. Balls 52 are provided in the slots 50 like the balls 12 in the slots 10. The grip 13 includes internal means for housing the balls 52, which means are axially offset relative to the means for housing the balls 12 so as to block the balls 52 radially, or on the contrary so as to leave them radial space enabling them to be received and clear a passage for the flange 4. It is by turning the grip in a manner similar to that used for controlling the balls 12, that the balls 52 can be blocked in position or released. The above-mentioned document FR 2 786 848 provides a full explanation of this coupler in which two operations on the sleeve enable the portion of the circuit that is isolated by the valve member to be purged before finishing off a disconnection.

It is thus in a central position that the grip 13 blocks both the balls 12 and the balls 52. A first turning operation enables the flange to pass the balls 12 while it is still retained by the balls 52. When the grip is released, resilient return means cause it to return to its central position. A second turning operation of the grip, in the opposite direction to the first, then enables the flange to go pass the balls 52.

Figure 4:
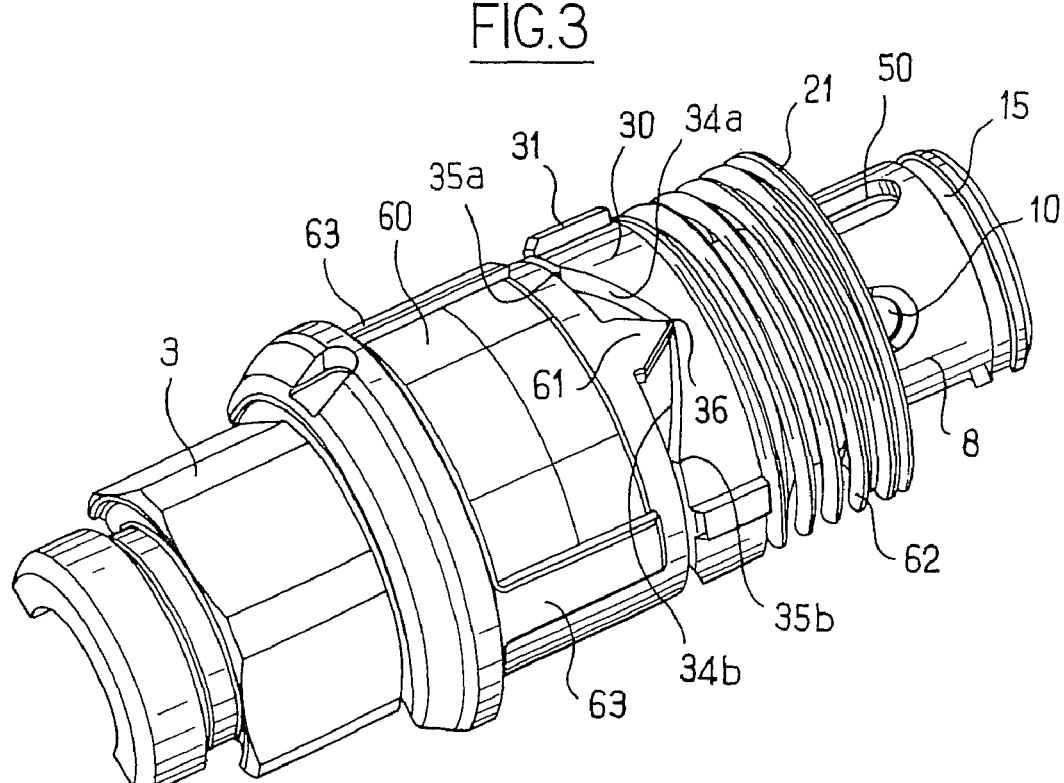
FIG. 4 is a fragmentary outside view of the FIG. 3 coupler, the outer grip being removed.

The means for resiliently returning the grip 13 into this central zone can be seen in particular in FIG. 4. The sleeve 41 has a stationary outer jacket 60 that carries a shoulder 60a similar to the shoulder 6a of FIGS. 1 and 2. This shoulder also has a projection 61 facing towards the ring 30 that is also present in this embodiment. In FIG. 4, there can be seen the splines 31 of this ring that co-operate with the grip 13 so as to constrain them to turn together. The ring 30 possesses two ramps 34a and 34b extending respectively between two extreme points 35a and 35b and a change-of-direction point 36 which constitutes the indexing point for indexing the angular position of the grip 13 relative to the sleeve 41, corresponding to said central position of the grip. A spring 62 is situated between the ring 21 and the ring 30. This spring performs two functions: it pushes the ring 30 towards the shoulder 60a, thereby causing the grip to be returned angularly if it is not already in its indexed position, and pushing the balls 12 and 52 into their respective slots 10 and 50 after the current connection has been made, during which the ring 21 is pushed towards the female endpiece in order to release the annular setback 19 described with reference to FIGS. 1 and 2.

This arrangement makes it possible to use only one spring, and above all it releases the grip 13 from any axial stress and from any interfering friction from a spring acting on the grip that would lead to faster wear of the parts concerned.

In the embodiment described, the extent to which the grip can be turned relative to the coupling is limited by the grooves and rings 14 and 15. In the version shown in FIGS. 3 and 4, means can be provided between the inside surface of the grip 13 and the jacket 60 to limit the extent to which the grip can be turned, for example external portions in relief 63 on the jacket 60 engaging a spline (not shown) on the inside surface of the grip 13 which comes into abutment against one or the other portion in relief depending on the direction of rotation of the grip.

What is claimed is:

1. A ball coupler having a longitudinal axis and comprising:
   a male tubular endpiece;
   a female tubular endpiece;
   a tubular sleeve extending the female endpiece and presenting slots for forming a cage for retaining balls for blocking the male endpiece in the female endpiece; and
   a grip coaxial about the sleeve and mounted to turn thereon about the longitudinal axis of the coupler between at least two angular positions relative to the sleeve, the grip possessing housing means for housing each ball, said housing means comprising for each ball:
      a first setback facing the corresponding slot when the grip is in a first position in order to retain the ball in question in a position for blocking the connection;
      a second setback offset angularly relative to the first setback and connected thereto so as to receive the blocking ball in a position for unblocking the connection when the grip is in a second position; and
      resilient return means for urging the grip into its first position;
   wherein said return means comprise, in the grip, a ring that is constrained to turn with the grip and that is movable axially relative thereto, said ring presenting two end surfaces, one of which faces towards a shoulder of the sleeve for slidably bearing thereagainst to co-operate in reversibly transforming turning movement of the grip into axial movement of the ring relative to said grip, and the other of which forms the bearing face for a compression spring tending to urge said ring against said shoulder.

2. A ball coupler according to claim 1, wherein the shoulder of the sleeve presents a projection turned towards the ring, with the end surface of the ring that faces the projection constituting, for said projection, an unstable bearing surface in the form of a ramp extending between two points that are axially offset relative to each other, the point of the ramp that is furthest from the shoulder being associated with an angular abutment for the projection in such a manner as to position the grip and the sleeve at a specific angular position in spite of the resilient return means urging the grip towards the shoulder of the sleeve.

3. A ball coupler according to claim 2, including, in the grip, an annular setback into which the first setback opens out axially in such a manner as to receive the balls in an unblocking position, and a second ring mounted in the annular setback for sliding between a position in which the second ring releases the annular setback, and a position in which the second ring closes the annular setback, and towards which the second ring is urged resiliently, pushing the balls into their first setback, and wherein the compression spring is placed between said two rings, and wherein the end surface of the ring facing towards the shoulder has two mutually adjacent ramps at the point where the grip is angularly positioned relative to the sleeve.

4. A ball coupler according to claim 1, including, in the grip, an annular setback into which the first setback opens out axially in such a manner as to receive the balls in an unblocking position, and a second ring mounted in the annular setback for sliding between a position in which the second ring releases the annular setback, and a position in which the second ring closes the annular setback, and towards which the second ring is urged resiliently, pushing the balls into their first setback, and wherein the compression spring is placed between said two rings.

* * * * *